United States Patent [19]

Hefner, Jr. et al.

[11] Patent Number: 4,921,927

[45] Date of Patent: May 1, 1990

[54] SULFIDE CONTAINING ALIPHATIC EPOXY RESINS

[75] Inventors: Robert E. Hefner, Jr.; Paul L. Wykowski, both of Lake Jackson, Tex.

[73] Assignee: The Dow Chemical Company, Midland, Mich.

[21] Appl. No.: 300,461

[22] Filed: Jan. 23, 1989

Related U.S. Application Data

[62] Division of Ser. No. 234,238, Aug. 19, 1988, Pat. No. 4,829,133, which is a division of Ser. No. 65,533, Jun. 23, 1987, Pat. No. 4,816,546.

[51] Int. Cl.$^5$ .............................................. C08G 59/02
[52] U.S. Cl. ...................................... 528/87; 525/523; 525/533; 528/364; 528/373; 528/380
[58] Field of Search ............... 525/481, 483, 523, 533; 528/87, 364, 380, 373

[56] References Cited

U.S. PATENT DOCUMENTS

| | | | |
|---|---|---|---|
| 2,731,437 | 1/1956 | Bender et al. | 525/483 |
| 3,248,403 | 4/1966 | Sagebarth et al. | |
| 3,759,871 | 9/1973 | Mickner | 528/109 |
| 3,838,078 | 9/1974 | Villa | 524/750 |
| 3,882,091 | 5/1975 | Villa | 528/374 |
| 3,951,927 | 4/1976 | Aloia | 525/535 |
| 4,000,213 | 12/1976 | Chang | 525/535 X |
| 4,017,554 | 4/1977 | Villa | 528/375 |
| 4,104,283 | 8/1978 | Mickner | 528/376 X |
| 4,136,086 | 1/1979 | Baumann et al. | 525/525 X |
| 4,316,979 | 2/1982 | Paul | 528/109 |
| 4,366,307 | 12/1982 | Singh et al. | 528/373 |

OTHER PUBLICATIONS

Chem. Abst. 82:45235q(1975).

*Primary Examiner*—Earl Nielsen

[57] ABSTRACT

Novel epoxy resins are prepared by dehydrohalogenating the reaction product of an epihalohydrin and a hydroxyalkyl containing polysulfide.

12 Claims, No Drawings

SULFIDE CONTAINING ALIPHATIC EPOXY RESINS

Cross-Reference to Related Applications

This application is a division of application Ser. No. 234,238 filed Aug. 19, 1988 now U.S. Pat. No. 4,829,132 which is a division of application Ser. No. 065,533 filed June 23, 1987 now U.S. Pat. No. 4,816,546 both of these applications are incorporated herein by reference in their entirety.

BACKGROUND OF THE INVENTION

The present invention provides novel aliphatic epoxy resins of hydroxyalkyl terminated sulfides and polysulfides as well as cured compositions prepared from said epoxy resins.

One class of epoxy functional polythioethers is disclosed by Singh, Hutt and Williams in U.S. Pat. No. 4,366,307. These epoxy functional polythioethers are prepared by the reaction of a hydroxyl or mercaptan terminated polythioether and a diepoxide compound, such as a diglycidyl ether of bisphenol A, in the presence of a catalyst. Although this teaching is not exemplified by working examples in U.S. Pat. No. 4,366,307, numerous problems and deficiencies are anticipated. Reaction of a difunctional epoxy compound and a di or polyhydroxyl or mercaptan terminated polythioether is expected to produce a substantial amount of polymeric species due to chain extension reaction. Any reaction sequence which might decrease this polymer formation is envisioned to require use of a substantial excess of difunctional epoxy compound. The resultant unreacted difunctional epoxy compound would then be difficult, if not impossible, to remove from the product, for example by distillation or extraction, without inducing further reaction or modification of the product. Additionally, the epoxy terminal groups obtained via the proposed process of U.S. Pat. No. 4,366,307 would be of the following structure, using the diglycidyl ether of bisphenol A as a representative example:

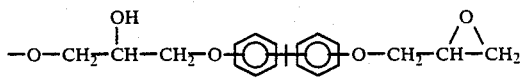

Because of the secondary backbone hydroxyl group formed in this process, extensive competition between this hydroxyl group and terminal hydroxyl groups present on the polythioether for reaction with the epoxide groups is expected to occur. The net result is expected to be a buildup of polymeric, crosslinked or branched products and/or induction of polyepoxide functionality capable of imparting deleterious properties to cured compositions thereof. Finally, the long chained structure required for the polythioethers of U.S. Pat. No. 4,366,307 is expected to lead to relatively high viscosity epoxide adducts from the reaction with diepoxide compounds, hence utility in many applications, for example as a reactive viscosity diluent for epoxy resins, would be severely limited.

The present invention provides aliphatic epoxy resin compositions resulting from epoxidizing hydroxyalkyl terminated sulfides and polysulfides with an epihalohydrin The resultant aliphatic sulfide containing epoxy resins are useful as reactive viscosity diluents or as flexibilizing comonomers for epoxy resins which enhance mechanical strength and corrosion resistance of the cured products thereof

SUMMARY OF THE INVENTION

One aspect of the present invention concerns aliphatic epoxy resin compositions resulting from dehydrohalogenating the reaction product of an epihalohydrin with one or more polysulfides represented by the following formulas I or II

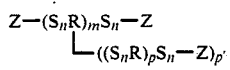

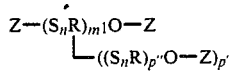

wherein each R is independently a polyvalent organic radical with each valence residing on a carbon atom and containing from one to about 18, more suitably from about two to about 12, most suitably from about two to about six carbon atoms; each Z is independently a hydroxyalkyl or inertly substituted hydroxyalkyl monovalent radical having from 1 to about 36, suitably from about 2 to about 12, most suitably from about 2 to about 6, carbon atoms: p and m are independently zero or a positive integer having a value from 1 to about 40, suitably from 1 to about 12, most suitably from 1 to about 6; $p''$ and $m^1$ are independently a positive integer having a value from 1 to about 40, suitably from 1 to about 12, most suitably from 1 to about 6; n is a number from 1 to about 8, suitably from 1 to about 4, most suitably from 1 to about 2: and $p'$ is zero or a positive integer which is the difference between the valence of R and two.

Another aspect of the present invention concerns thermosettable (curable) compositions prepared by combining one or more of the aforesaid epoxy resin compositions with a curing quantity of at least one suitable curing agent and/or catalyst therefor.

Another aspect of the present invention concerns the reaction product of (A) one or more of the aforesaid epoxy resin compositions with (B) one or more compounds having an average of more than one aromatic hydroxyl group per molecule represented by the formulas III, IV, V or VI:

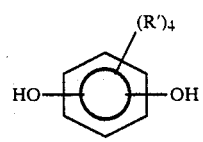

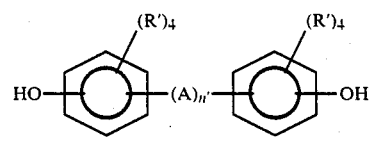

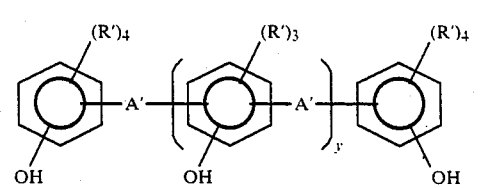

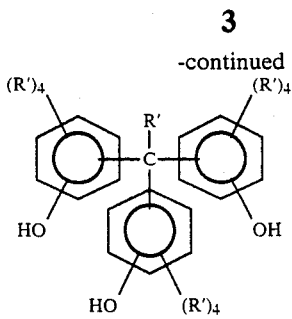

wherein A is a divalent hydrocarbon group having from 1 to about 12, suitably from 1 to about 6 carbon atoms, —S—, —S—S—, —SO—, —SO₂—, —CO—, "O— and the like; A' is a divalent hydrocarbon group having from 1 to about 3, suitably 1, carbon atom or a

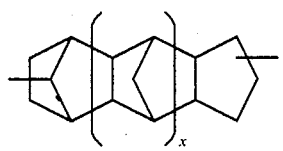

group; each R' is independently hydrogen, a hydrocarbyl or hydrocarbyloxy group having from 1 to about 18, suitably from 1 to about 4, carbon atoms or a halogen, suitably chlorine or bromine: n' has a value of zero or 1; x has a value from zero to about 10, suitably from zero to about 3: and y has a value from about 0.001 to about 6, suitably from 0.1 to about 5: optionally in the presence of one or more advancement catalysts: and wherein the mole ratio of hydroxyl groups contained in component (B) to epoxide groups contained in component (A) is from about 0.01:1 to about 5:1, suitably from about 0.1:1 to about 2:1, more suitably from about 0.1:1 to about 0.9:1.

Another aspect of the present invention concerns epoxy resin blends prepared by combining (A) one or more of the aforesaid epoxy resin compositions with (B) one or more epoxy resins represented by the formulas VII, VIII, IX, X or XI:

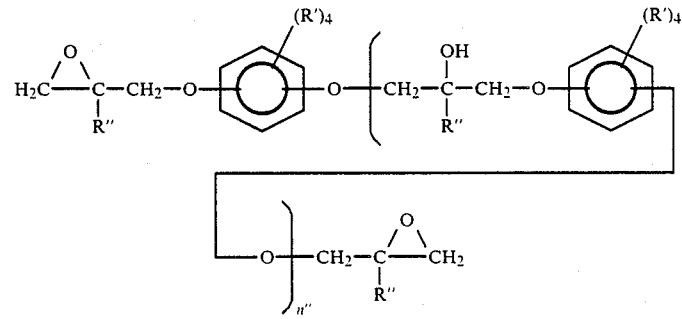

VII.

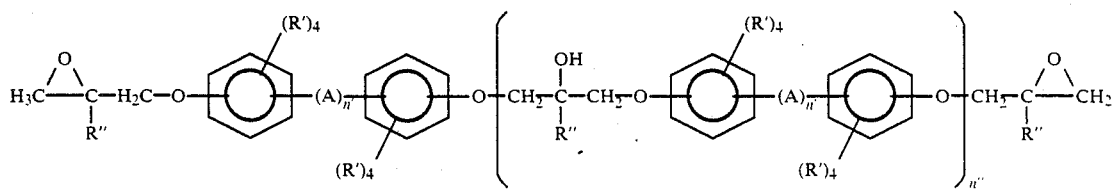

VIII.

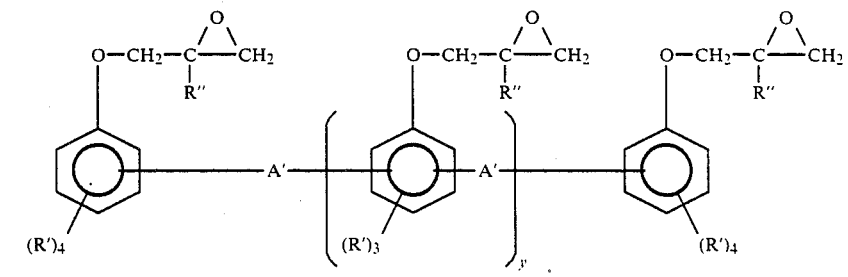

IX.

-continued

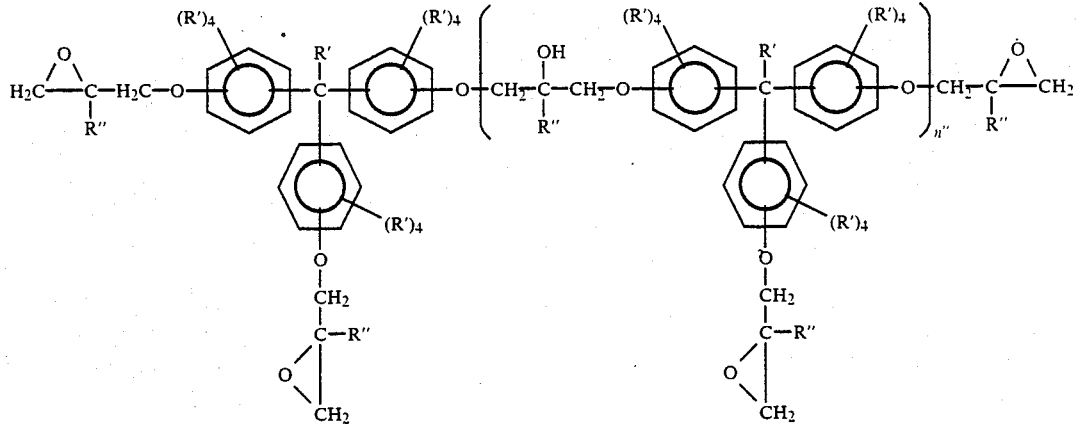
X.

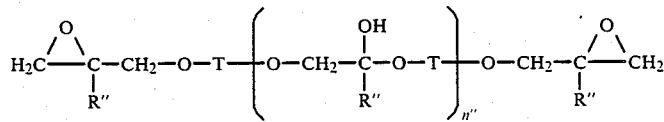
XI.

wherein A, A', R', n' and y are as hereinbefore defined, T is a divalent alkyl or cycloalkyl radical containing from 1 to about 15 carbon atoms or a group:

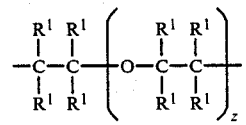

each R'' is independently hydrogen or an alkyl group having from 1 to about 4 carbon atoms: each $R^1$ is independently hydrogen or a hydrocarbyl group having from 1 to about 6 carbon atoms; n'' has a value from zero to about 40, suitably from 0.1 to about 5: z has a value from 1 to about 100, suitably from 1 to about 25: each $R^1$ is independently hydrogen or a hydrocarbyl group having from 1 to about 6 carbon atoms: and wherein component (A) is present in an amount from about 1 to 99, suitably from about 1 to about 50, more suitably from about 5 to about 40, percent by weight of the combined weight of components (A) and (B).

Another aspect of the present invention concerns thermosettable (curable) compositions prepared by combining the aforesaid epoxy resin blends with a curing quantity of at least one suitable curing agent and/or catalyst therefor Another aspect of the present invention concerns the reaction product of (A) one or more of the aforesaid epoxy resin blends with (B) one or more polyphenols represented by formulas III, IV, V, VI wherein the mole ratio of hydroxyl groups contained in component (B) to epoxide groups contained in component (A) is from about 0.01:1 to about 5:1.

Still another aspect of the present invention pertains to the compositions resulting from curing the aforementioned thermosettable compositions.

DETAILED DESCRIPTION OF THE INVENTION

One class of hydroxyalkyl terminated sulfides and polysulfides (Formula I) used to produce the epoxy resin compositions of the present invention are conveniently prepared using the methods described in U.S. Pat. Nos. 1,890,191 and 2,466,963 which are incorporated herein by reference. In the general method, a metal sulfide or polysulfide and one or more hydroxyalkyl compounds having negatively charged functionality which will split off upon reacting with the metal sulfide or polysulfide are reacted together. Metal sulfides or polysulfides useful in preparing the sulfides and polysulfides employed to prepare the epoxy resins of the invention are soluble sulfides or polysulfides of a mono- or divalent metal cation which forms a bond with the sulfide or polysulfide which bond is primarily ionic in character, that is, dissociates in water. Particularly useful metal sulfides and polysulfides are those of calcium, magnesium, lithium, potassium and sodium. Of these, the sodium sulfides and polysulfides are most preferred.

When a metal polysulfide is used it can be prepared by reacting a dissolved metal monosulfide with elemental sulfur and refluxing the mixture to form the desired polysulfide Alternatively, the desired polysulfides are prepared by reacting anhydrous metal sulfides with molten sulfur or reacting aqueous sodium hydroxide with elemental sulfur.

The number of sulfur atoms in the sulfide or polysulfide chain is referred to in the art as the sulfur rank. The rank of the polysulfide chains is controlled by varying the proportions of the metal sulfide and elemental sulfur employed to form said metal polysulfide By increasing the proportion of elemental sulfur to the metal sulfide, the average rank of the resulting polysulfide is increased. In the formation of the polysulfide by the reaction of sodium hydroxide with elemental sulfur, longer sulfur chains are formed by increasing the temperature at which the reaction is carried out. However, precise control of the sulfur rank is not achieved by any of these processes and the polysulfide chains so produced will have varying ranks. Thus, the rank of the sulfur chains produced represents only a number average of the actual individual ranks, and it is understood that said actual individual ranks will vary, with the majority of the polysulfide chains having ranks within one of the designated rank.

In making this class of hydroxyalkyl terminated polysulfides used to produce the epoxy resin compositions of the present invention, the metal sulfide or polysulfide is reacted with a hydroxyalkyl compound represented by the formula $$HO-Z^1-Q$$

wherein $Z^1$ is an unsubstituted or inertly substituted divalent alkyl group such as, for example,

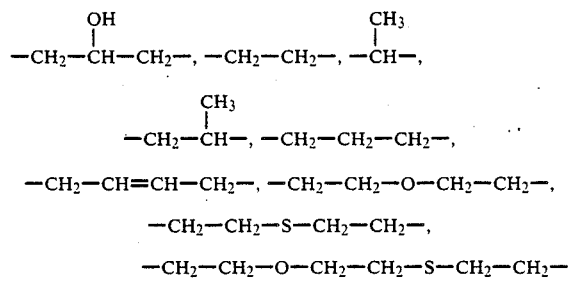

and the like and Q is a negatively charged functionality which will split off upon reacting with the metal sulfide or polysulfide. By inertly substituted is meant that the substituent group does not chemically react under the conditions of the reaction to produce the hydroxyalkyl terminated sulfides and polysulfides. Exemplary inert substituents include hydroxyl groups, unsaturated groups (alkenyl groups), ether linkages and sulfide linkages. $Z^1$ can be straight chain, cyclic, or branched, although straight chain groups having 2 to 4 carbon atoms are preferred. Most suitably, the hydroxyalkyl compound is ethylene chlorohydrin (2-chloroethanol), propylene chlorohydrin or ethylene bromohydrin.

Hydroxyalkyl terminated sulfide and polysulfide oligomers and polymers are formed by introducing, in addition to the hydroxyalkyl compound, an organic compound having a plurality of negatively charged functionalities attached to aliphatic or cycloaliphatic carbon atoms which functionalities will split off upon reacting with the metal sulfide or polysulfide in the reaction mixture As used herein, the term negatively charged functionality means as functional group which will split off on reacting with the metal sulfide or polysulfide to form an anionic species in solution. The reaction of polysulfides and polyfunctional organic compounds is well known in the art and is first described in U.S. Pat. No. 1,890,191 to Patrick. Suitable polyfunctional organic compounds include alkyl dihalides, disulfates, diacetates and the like which will react with the sulfide or polysulfide and the hydroxyalkyl compound to form a linear oligomer or polymer represented by the formula $$HO-Z^1-(S_nR^2)_mS_n-Z^1-OH$$

wherein m is a positive integer having a value from 1 to about 40, n and $Z^1$ are as hereinbefore defined and $R^2$ represents an organic diradical with each valence residing on a carbon atom, which is the residue of the difunctional organic compound after the splitting off of the negatively charged functionalities. The $R^2$ group, and correspondingly, the difunctional organic compound, may further contain inert substituents including unsaturated groups (alkenyl groups), ether linkages, sulfide linkages, hydroxyl groups or combinations of said inert substituents. In general, those difunctional monomers previously known to react with metal polysulfides to form polymers therewith are also suitably employed in the present invention. Preferred polyfunctional monomers include dichloroethane; bis-2-chloroethyl formal; bis-4-chlorobutyl ether; bis-4-chlorobutyl formal and 1,3-dichloro-2-propanol. Other difunctional monomers, which are illustrative of the wide scope of monomers suitably employed herein include, for example, bis(4-chloromethyl)phenyl ether, 1,4-dichloro-2-butene, bis(4-chloroacetyl)phenyl ether, 2,5'-di(chloromethyl)1,4-dioxane and diethylene glycol bis(chloroacetate).

Trifunctional, tetrafunctional and pentafunctional organic compounds, such as 1,2,3-trichloropropane and the like, can be employed in conjunction with difunctional organic compounds and will react with the metal sulfide or polysulfide and the hydroxyalkyl compound to form a branched oligomer or polymer represented by the formula

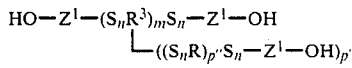

wherein R, $Z^1$, m, n, p, p', and p'' are as hereinbefore defined and $R^3$ represents an organic polyradical with each valence residing on a carbon atoms, which is the residue of the polyvalent organic compound after splitting off of the negatively charged functionalities. The $R^3$ group, and correspondingly the polyfunctional organic compound, may further contain inert substituents including unsaturated groups (alkenyl groups), ether linkages, sulfide linkages, hydroxy groups or combinations of said inert substituents.

The reaction is suitably carried out by heating the aqueous sulfide or polysulfide solution from about 25° to about 90° C., suitably from about 50° C. to about 80° C., and adding the polyfunctional organic compound(s) and the hydroxyalkyl compound(s) over a period of about 5 minutes to about 2 hours. The mixture is then heated at from about 25° C. to about 90° C., suitably from about 50° C. to about 80° C., for about 1 to 3 hours to form the desired hydroxyalkyl terminated sulfide or polysulfide.

Because the metal sulfide or polysulfide is ordinarily contained in an aqueous phase, the organic reactants are advantageously intermixed with the aqueous phase to facilitate the reaction. Said intermixing can be achieved by adjusting the density of the aqueous phase to approximate that of the organic phase or by forming an emulsion. An emulsion can be created by the addition of a suspending agent such as magnesium hydroxide in conjunction with a surfactant such as sodium lauryl sulfate or other organic surfactants such as alkylated sulfonated phenyl ethers. The suspended organic phase thus reacts more readily with the dissolved sulfide or polysulfide to form the desired hydroxyalkyl terminated sulfide or polysulfide. Following the reaction, the product is recovered by breaking the emulsion. This can be done by adding water and acid to adjust the pH to about 2 to 6, suitably from about 3 to 5. Alternatively, the product can be recovered by adding an organic solvent such as acetone, or by mechanical means such as centrifugation, or combinations thereof. Means for recovering organic products from an emulsion are well known in the art. It is operable for the epoxidation reaction of the present invention, not to recover the product from the emulsion, but instead employ the product in the form of a latex.

By varying the proportion of the hydroxyalkyl compound employed in the reaction, the molecular weight of the product is controlled. Molecular weight increases as the proportion of the hydroxyalkyl compound is decreased.

Hydroxyalkyl terminated sulfides (Formulas I and II) used to produce the epoxy resin compositions of the present invention are also prepared via reaction of one or more alkylene oxides with hydrogen sulfide or one or more mercaptoalcohols. Suitable alkylene oxides include ethylene oxide, propylene oxide, butylene oxide, isobutylene oxide, mixtures thereof and the like. Suitable mercaptoalcohols include mercaptoethanol, mercaptopropanols, mercaptobutanols, mercaptocyclohexanols, mixtures thereof and the like. The reaction is carried out using methods well known in the art. As a general example, two moles of ethylene oxide and one mole of $H_2S$ can be reacted to produce thiodiglycol (Formula I where Z is $HO-CH_2-CH_2-$, n is 1, m is 0). Alternatively, the reaction can be performed stepwise wherein one mole of $H_2S$ and one mole of ethylene oxide are reacted to produce 2-mercaptoethanol. A mole of mercaptoethanol and a mole of ethylene oxide are then reacted to produce thiodiglycol. Reaction of a stoichiometric excess of alkylene oxide, for example 2 moles of ethylene oxide and one mole of 2-mercaptoethanol, yields hydroxyalkyl terminated sulfides containing both sulfide and ether linkages (Formula II where Z is $HO-CH_2-CH_2-$, n is 1, R is $-CH_2-CH_2-$, $m^1$ is 1, p' is 0). Reaction with additional ethylene oxide produces compositions wherein Z in Formula II is a $HO-CH_2-CH_2-(O-CH_2-CH_2)_t-$ group with t having a statistical value contingent on the amount of ethylene oxide reacted. Although ethylene oxide was mentioned for exemplary purposes, it is understood that other of the alkylene oxides, substituted alkylene oxides or combinations thereof could be employed.

Hydroxyalkyl terminated polysulfides containing three or more hydroxyl groups are prepared using methods known to the art including those taught by U.S. Pat. No. 4,366,307 which is incorporated herein by reference.

Exemplary reactions include the coupling reaction of the sodium salt of a mercaptoalcohol with an epihalohydrin followed by reaction of the resultant monoepoxide with a mercaptoalcohol. As a general example, the sodium thiolate of mercaptoethanol and epichlorohydrin react to provide the intermediate monoepoxide:

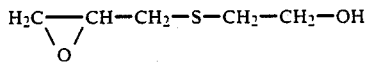

Reaction of the monoepoxide with mercaptoethanol provides the triol represented by the formula

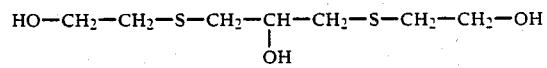

which is Formula I wherein Z is $HO-CH_2-CH_2-$, n is 1, m is 1, R is

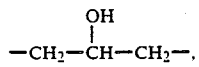

and p' is zero. As a second exemplary reaction, one or more aliphatic diepoxides and a mercaptoalcohol are reacted using a 1:1 mole ratio of epoxide groups to mercaptan groups As a general example, dipropylene glycol diglycidyl ether and mercaptoethanol react to provide the tetrol

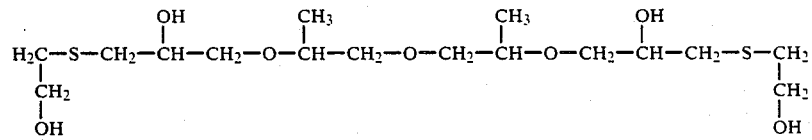

which is Formula I wherein Z is $HO-CH_2-CH_2-$, n is 1, m is 1, R is

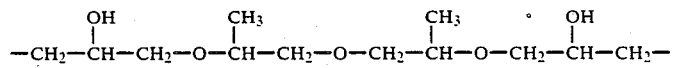

and p' is zero As a third exemplary reaction, a glycidol and a mercaptoalcohol are reacted using a 1:1 mole ratio of epoxide groups to mercaptan groups. As a general example, glycidol and mercaptoethanol react to provide the triol

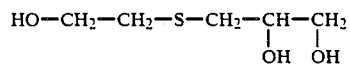

which is Formula I wherein Z is

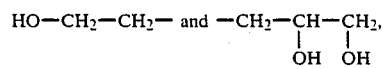

Aliphatic or cycloaliphatic dimercaptans are useful in the preparation of the hydroxylalkyl terminated sulfides. Suitable dimercaptans include 1,4-dimercaptobutane, 1,12-dimercaptododecane, 1,4-dimercaptocyclohexane, mixtures thereof and the like. The reaction with an alkylene oxide is carried out using methods well known in the art. As a general example, two moles of ethylene oxide and one mole of 1,4-mercaptobutane can be reacted to produce the diol

HO—CH$_2$—CH$_2$—S—(CH$_2$—)$_4$S—CH$_2$—CH$_2$—OH which is Formula I wherein Z in HO—CH$_2$—CH$_2$—, n is 1, R is (—CH$_2$—)$_4$, m is 1, p' is zero.

Epoxidation of the hydroxyalkyl terminated sulfides and polysulfides is accomplished by reaction with an epihalohydrin in the presence of one or more basic-acting substances, such as an alkali metal hydroxide and one or more suitable phase transfer catalysts such as a quaternary ammonium or phosphonium salt. In the process for preparing the epoxides of the present invention, an equivalent ratio of epihalohydrin to hydroxyalkyl terminated sulfide or polysulfide of from about 1.5:1 to about 20:1, suitably from about 3:1, to about 7.5:1 is employed. An equivalent ratio of the basic-acting substance per equivalent of hydroxyl groups contained in the hydroxyalkyl terminated sulfide or polysulfide of from about 1.5:1 to about 6.5:1, suitably from about 2:1 to about 4:1 is employed. The phase transfer catalyst is employed in an amount from about 1 to about 25, suitably from about 5 to about 20 percent by weight of the hydroxyalkyl terminated sulfide or polysulfide used. Water is employed in an amount of from about 1.0 to about 75, suitably from about 50 to about 75 percent by weight of the basic-acting substance used.

The reaction is conducted at a temperature of from about 20° C. to about 80° C., suitably from about 25° C. to about 60° C. for from about 60 minutes to about 240 minutes, suitably from about 75 minutes to about 150 minutes. If desired, the reaction can also, be conducted under a partial vacuum using pressures below 760 mm Hg to about 75 mm Hg. If the reaction is conducted under a vacuum which leads to distillative removal of epihalohydrin or epihalohydrin—water azeotrope from the reaction mixture, it is generally desirable to add makeup epihalohydrin to the reaction mixture.

One or more solvents which are inert to the reactants used in the epoxidation reaction can optionally be employed. Typical of such solvents are the aromatic hydrocarbons, such as toluene, xylene: the aliphatic ethers, such as dioxane, dibutyl ether; the halogenated hydrocarbons, such as methylene chloride, methylchloroform; the aliphatic ketones, such as methyl ethyl ketone: mixtures thereof and the like.

The reaction is conducted in stages wherein at least two, and suitably three or four stages are employed. In the first stage, the hydroxyalkyl terminated sulfide or polysulfide, the epihalohydrin, the phase transfer catalyst, and solvent, if used, are combined and maintained with agitation and heating. Dropwise addition of from about 1 to about 2 equivalents of base per hydroxyl equivalent contained in the hydroxyalkyl terminated sulfide or polysulfide dissolved in from about 25 to about 75 weight percent water is started and is completed over a period of from about 20 minutes to about 30 minutes. A post reaction of from about 10 minutes to about 20 minutes is followed by separation and discarding of the aqueous layer from the reaction mixture. Subsequent stages consist of dropwise addition of from about 0.5 to about 1.5 equivalents of base per hydroxyl equivalent contained in the hydroxyalkyl terminated sulfide or polysulfide dissolved in from about 25 to about 75 weight percent water to the reaction mixture, followed by post reaction and separation of the aqueous discard layer.

The reaction can also be performed wherein the indicated equivalents of base are added to the reaction mixture neat, i.e., without dissolution in water, and at a rate so as to maintain the previously defined range of reaction temperatures. The recovered product from the final stage is typically washed with water then distilled under vacuum to remove excess epihalohydrin and solvent, if used. If desired, additional epihalohydrin and/or phase transfer catalyst can be added at any of the stages following the initial stage as is deemed necessary to complete the epoxidation reaction. The number of stages required to substantially complete the epoxidation varies as a function of the reaction time, temperature, type of hydroxyalkyl terminated sulfide or polysulfide reactant used, and other known variables. It is generally desirable to complete enough stages to effect 90 percent or more conversion of hydroxyl groups to glycidyl ether groups.

Typical basic-acting substances, which can be used in the epoxidation process include, for example, the alkali metal hydroxides, such as sodium and potassium hydroxide. Typical phase transfer catalysts include, for example, the quaternary ammonium or phosphonium salts such as benzyltrimethylammonium chloride, benzyl trimethylammonium hydroxide, ethyltriphenylphosphonium bromide, tetrabutylphosphonium bromide and methyl trioctyl ammonium chloride. Typical epihalohydrins include, for example, epichlorohydrin, epibromohydrin and methyl epichlorohydrin.

A typical representation of the epoxy resins of the present invention resulting from epoxidizing the products of Formulas I and II would be the following, wherein R" is hydrogen or an alkyl group having from 1 to about 4 carbon atoms and which would be hydrogen when epichlorohydrin is employed in the preparation:

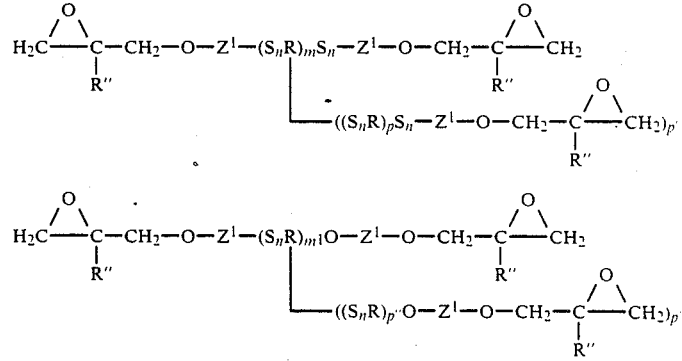

It is understood that minor amounts of other structures may be present in the epoxy resins of the present invention. As a specific example, it is known that the present epoxidation process leads to the formation of minor amounts of the diglycidyl ether of the epihalohydrin used. This coproduct material is desirably removed from the product via conventional separation techniques such as, for example, vacuum distillation.

Advancement reaction of the aliphatic epoxy resins of the present invention or blends of the aliphatic epoxy resins and one or more epoxy resins (Formulas VII, VIII, IX, X or XI) with one or more polyphenols (Formulas III, IV, V, VI) is optionally, although suitably, completed in the presence of one or more advancement catalysts. Suitable advancement catalysts which can be employed herein include most any catalyst which will catalyze the reaction between a vicinal epoxy group and a phenolic hydroxyl group or carboxylic acid group. Such catalysts include, for example, those disclosed in U.S. Pat. Nos. 3,306,872; 3,341,580; 3,379,684; 3,477,990: 3,547,881; 3,637,590: 3,843,605: 3,948,855: 3,956,237: 4,048,141: 4,093,650: 4,131,633: 4,132,706: 4,171,420: 4,177,216 which are incorporated herein by reference.

Particularly suitable catalysts are the quaternary phosphonium and ammonium compounds such as, for example, ethyltriphenylphosphonium chloride, ethyltriphenylphosphonium bromide, ethyltriphenylphosphonium iodide, ethyltriphenylphosphonium acetate, ethyltriphenylphosphonium acetateacetic acid complex, ethyltriphenylphosphonium phosphate, tetrabutylphosphonium chloride, tetrabutylphosphonium bromide, tetrabutylphosphonium iodide, tetrabutylphosphonium acetate, tetrabutylphosphonium acetateacetic acid complex, butyltriphenylphosphonium tetrabromobisphenate, butyltriphenylphosphonium bisphenate, butyltriphenylphosphonium bicarbonate, benzyltrimethylammonium chloride, tetramethylammonium hydroxide, mixtures thereof and the like.

The reaction to produce the advanced epoxy resin is usually conducted at a temperature of from about 75° C. to about 250° C., suitably from about 125° C. to about 220° C. for from about 15 minutes to about 480 minutes, suitably from about 30 minutes to about 120 minutes.

When the mole ratio of phenolic hydroxyl groups to epoxide groups used in the advancement reaction is from about 0.01:1 to about 0.90 to 1, an advanced aliphatic epoxy resin possessing curable epoxide groups results. When the mole ratio of phenolic hydroxyl groups to epoxide groups used in the advancement reaction is about 1:1, a phenolic cured epoxy resin is produced. Increasing mole ratios of phenolic hydroxyl groups to epoxide groups provide phenolic capped aliphatic epoxy resin functionalities. As a specific example, reaction of a diglycidyl ether of a dihydroxyalkyl terminated sulfide or polysulfide with bisphenol A is a quantity to provide a 3:1 mole ratio of phenolic hydroxyl groups to epoxide groups yields the corresponding phenolic hydroxyl terminated adduct of the diglycidyl ether plus unreacted bisphenol A. Thus the reaction product of thiodiglycol (Formula I wherein Z is HO—CH$_2$—CH$_2$—, m is 0, n is 1) and bisphenol A (Formula IV wherein R' is H, n' is 1 and A is

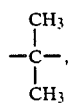

in a quantity to provide a 3:1 mole ratio of phenolic hydroxyl groups to epoxide groups provides the following phenolic hydroxyl terminated adduct:

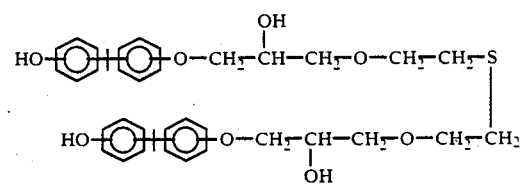

plus unreacted

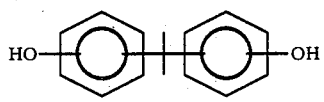

Depending on the reaction configuration used, some minor amounts of chain extended species can also be present due to advancement reaction. This is generally minimized by utilizing a reaction configuration wherein a portion of the aliphatic epoxy resin is added to the large excess of bisphenol A and allowed to substantially react prior to addition of the next portion of aliphatic epoxy resin. The resultant phenolic hydroxyl terminated adducts are useful for advancement reaction with the epoxy resins of formulas VII, VIII, IX, X and as phenolic functional epoxy resin curing agents.

As is common practice with epoxy resin advancement chemistry, one or more monofunctional epoxide reactive materials can be included in the advancement reaction of the aliphatic epoxy resins of the present invention or blends of the aliphatic epoxy resins with one or more epoxy resins (Formulas VII, VIII, IX, X or XI) and one or more polyphenols (Formulas III, IV, V or VI). It is also operable to complete the aforesaid advancement reaction using only one or more monofunctional epoxide reactive materials (no polyphenol present). Typical monofunctional epoxide reactive materials include the monophenols such as nonylphenol, p-tert-butylphenol phenol; the monocarboxylic acids such as benzoic acid, methyl benzoic acid; the monothiols such as thiophenol, mixtures thereof and the like.

The epoxy resin blends of the present invention are prepared by combining one or more aliphatic epoxy resins of the present invention with one or more epoxy resins of formulas VII, VIII, IX, X. The resultant blends can be reacted with one or more polyphenols in an advancement reaction or cured using hereinbefore described methods. In general, the epoxy resin blends prepared using the diglycidyl ethers of hydroxyalkyl terminated sulfides and polysulfides of Formula I wherein p' is 0, m is 0 or 1, n is 1 or 2 and R and Z are as hereinbefore defined or Formula II wherein p'0, m$^1$ is 1 and R and Z are as hereinbefore defined are useful as low viscosity resins for curable coatings and adhesives. Other of the aforesaid blends, especially wherein m of Formula I or m$^1$ of Formula II are >2 are useful for preparing flexible or toughened coatings, especially stone chip resistant coatings, coil coatings, and cathodic electrodeposited coatings The epoxy resins, epoxy resin blends or advanced epoxy resins of the present invention can be cured with any suitable curing agent and/or catalyst therefor. Suitable such curing agents and catalysts are described in the *Handbook of Epoxy Resins* by Lee and Neville, 1967 McGraw-Hill which is incorporated herein by reference and include, for example, primary and secondary polyamines, polycarboxylic acids and anhydrides thereof, phenolic hydroxyl-containing compounds, guanidines, biguanides, urea-aldehyde resins, melamine-aldehyde resins, alkoxylated urea-aldehyde resins, alkoxylated melamine-aldehyde resins, amidoamines, alkanolamines, boron trifluoride complexes such as boron trifluoride etherate and boron trifluoride monoethanolamine, sulfanilamide, combinations thereof and the like. Particularly suitable curing agents include, for example, primary and secondary polyamines, phenolic hydroxyl-containing compounds, combinations thereof and the like. The curing agents are employed in an amount which will effectively cure the composition containing the modified epoxy resin. These amounts will depend upon the particular modified epoxy resin and curing agent employed: however, suitable amounts include, for example, from about 0.91 to about 1.2, more suitably from about 0.95 to about 1.05, most suitably from about 0.98 to about 1.02 equivalents of epoxide reactive hydrogen groups in the curing agent per epoxide equivalent contained in the epoxy resin.

The aliphatic epoxy resins of the present invention as well as advanced epoxy resins and epoxy resin blends thereof can be blended with other materials such as solvents or diluents, fillers, pigments, dyes, flow modifiers, thickeners, reinforcing agents, other resinous products, fire suppressants, low profile additives, dispersants, combinations thereof and the like; and cured to form useful products These additives are added in functional equivalent amounts e.g., the pigments and/or dyes are added in quantities which will provide the composition with the desired color: however, they are suitably employed in amounts of from about 0.1 to about 10, suitably from about 0.5 to about 7.5, more suitably from about 1 to about 5 percent by weight based upon the weight of the total composition.

Solvents or diluents which can be employed herein include, for example, hydrocarbons, ketones, glycol ethers, chlorinated hydrocarbons, cyclic ethers, alcohols, combinations thereof and the like. Particularly suitable solvents or diluents include, for example, toluene, xylene, methyl ethyl ketone, methyl isobutyl ketone, methylamyl ketone, diethylene glycol methyl ether, dipropylene glycol methyl ether, cyclohexanone, tetrahydrofuran, 1,4-dioxane, trichloroethane, secondary butyl alcohol, tertiary amyl alcohol, isopropanol, combinations thereof and the like.

The modifiers such as thickeners, ilow modifiers and the like can be suitably employed in amounts of from about 0.1 to about 25, suitably from about 0.5 to about 20, more suitably from about 1 to about 10 percent by weight based upon the weight of the total composition.

The fillers can be suitably employed in amounts of from about 1 to about 90, suitably from about 10 to about 50, more suitably from about 20 to about 40 percent by weight based upon the weight of the total composition.

The epoxy resins of the present invention are useful to make coatings, laminates, castings, encapsulations, and the like. The laminates are made by curing the aforesaid epoxy resin to which a suitable fibrous reinforcing agent such as asbestos fibers, carbon fibers, fibrous glass, aramid fibers or inorganic fibers has been added. The fibers can be in the form of mats, strands, sheets, filaments, yarns chopped stands, ribbons and the like. The aforesaid epoxy resin formulation can be rolled, sprayed or impregnated into the fibrous reinforcement.

A preferred use for the cured epoxy resins of the present invention is in a protective coating over metals, such as steel, which are susceptible to corrosion and chemical attack.

The following examples are illustrative of the present invention and are not to be construed as to limiting the scope thereof in any manner.

EXAMPLE 1

Epoxidation of a Polythioether Diol

A 5-neck, 2 liter round bottom flask is modified with the following items: a jacket for heat-transfer fluid, an outlet from the bottom with a 6 mm teflon stopcock, and baffles. The reactor is then fitted with a reflux condenser, a pressure equalizing addition funnel, a thermometer, a nitrogen inlet, and a mechanical stirring mechanism. Epichlorohydrin (936.67 g, 10.12 equivalents) is charged to the reactor with heating, stirring, and a nitrogen blanket (0.5 lpm). A polythioether diol (501.45 g, 2.04 equivalents) is added to the stirred epichlorohydrin followed by 35.7 g of phase transfer catalyst (methyltrialkyl ($C_8$–$C_{10}$) ammonium chloride). The polythioether diol has the following structure:

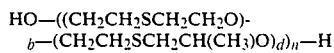

(n=4 to 6 and b and d are integers such that b/(b+d) has a value of 0)

This mixture is heated to 40° C. An aqueous solution of 50% by weight of sodium hydroxide (291.8 g, 3.65 equivalents) is poured into the pressure equalizing addition funnel and is added dropwise to the epichlorohydrin/diol solution. The reaction mixture produces an exotherm to 63° C. within 10 minutes and cooling water flow is initiated to the reactor jacket. The water is drained from the jacket allowing the mixture to reach a temperature of 56° C. This cooling cycle is repeated as necessary to maintain the temperature between 56 and 63° C. The caustic addition is completed over a 29 minute period after which the stirring is maintained for 16 minutes with the continuation of the above-mentioned heating-cooling cycles to maintain a temperature range between 56 and 62° C. The product mixture is cooled to 35° C. followed by the addition of 300 ml deionized water. The mixture is transferred to a 2 liter separatory funnel. Approximately 450 ml of an aqueous raffinate (lower layer) is drawn off and discarded and approximately 1300 ml of a beige opaque product (upper layer) phase is drawn off and placed back into the reactor along with an additional amount of epichlorohydrin (95.5 g, 1.03 equivalents). Heating and stirring under the nitrogen blanket is resumed. The mixture is heated to 40° C. after which 50% by weight aqueous sodium hydroxide (135.5 g, 1.69 equivalents) is added dropwise over a 21 minute period. The temperature is maintained between 57 and 62° C. during the aqueous sodium hydroxide addition. After a fifteen minute post-reaction period, the mixture is cooled to 35° C. and 300 ml of deionized water is added. The product is transferred to a 2 liter separatory funnel and drawn off from the aqueous raffinate. The above-mentioned caustic addition, post-addition, and separation steps are repeated a third and fourth time using a 15 minute addition time and 15 minute post-addition reaction time with the product being (50° C. and 50% by weight sodium hydroxide third addition, 132.2 g, 1.65 equivalents; fourth addition, 129.3 g, 1.62 equivalents). After the final caustic addition, and post-reaction, 300 ml of deionized water is added to the product. The mixture is transferred to a 2 liter separatory funnel containing an additional 500 ml of deionized water. The aqueous raffinate is now the upper layer. A 300 ml volume of methylene chloride is used to extract the mixture. The lower phase is drawn off and set aside. The aqueous raffinate is extracted twice more with 200 ml portions of methylene chloride. All extracts are then combined. The combined extracts are then washed once with 300 ml deionized water. The methylene chloride is removed from the product on a rotary evaporator under 1–2 torr (133–267 Pa) pressure at 106° C. for 20 minutes followed by filtration through Whatman no. 42 filter paper. The filtrate is distilled on a rotary evaporator under gradually increasing temperature and vacuum to achieve 102° C. at 1–2 torr (133–267 Pa ) for 70 minutes. The final product is recovered in 89.4% yield (550.6 g) as an amber liquid (Gardner color 6) with a 175 cks kinematic viscosity at 25° C. Epoxide titration reveales the presence of 14.06±0.01% epoxide.

EXAMPLE 2

Epoxidation of a Polythioether Triol

A 5-neck, 2 liter round bottom flask is modified with the following items: a jacket for heat-transfer fluid, an outlet from the bottom with a 6 mm teflon stopcock and baffles. The reactor is then fitted with a reflux condenser, a pressure equalizing addition funnel, a thermometer, a nitrogen inlet, and a mechanical stirring mechanism. Epichlorohydrin (473.40 g, 5.12 equivalents) is charged to the reactor with heating, stirring, and a nitrogen blanket (0.5 lpm). A polythioether triol (394.97 g, 0.998 equivalent) is added to the stirred epichlorohydrin followed by 19.80 g of phase transfer catalyst (methyl trialkyl ($C_8$–$C_{10}$) ammonium chloride). The thioether triol has the following structure:

HO—$((CH_2CH_2SCH_2CH_2O)_b$—$OCH_2CHOHC$-
$H_2O$— $(CH_2SCH_2CH(CH_3)O)_d)n$—H (n=8 to 10 and b and d are integers such that b/(b+d) has a value of O)

This mixture is heated to 40° C. An aqueous solution of 50% by weight of sodium hydroxide (148.4 g, 1.855 equivalents) is poured into the pressure equalizing addition funnel and is added dropwise to the epichlorohydrin/triol solution The reaction mixture produces an exotherm to 63° C. within 11 minutes and cooling water flow is initiated to the reactor jacket. The water is drained from the jacket allowing the mixture to reach a temperature of 56° C. This cooling cycle is repeated as necessary to maintain the temperature between 56 to 63° C. The caustic addition is completed over a 25 minute period after which the stirring is maintained for fifteen minutes with the continuation of the above-mentioned heating-cooling cycles to maintain a temperature range between 56 and 63° C. The product mixture is cooled to 35° C. followed by addition of 300 ml of deionized water. The mixture is transferred to 8 ounce bottles and centrifuged for 10 minutes at 2500 rpm. Afterwards, the product solution is drawn off from the aqueous raffinate and added back to the reactor. Heating and stirring under the nitrogen blanket is resumed. The mixture is heated to 40° C. after which 50% by weight aqueous sodium hydroxide (65.7 g, 0.82 equivalent) is added dropwise over a 18 minute period. The temperature is maintained between 56 and 63° C. during the aqueous sodium hydroxide addition. The caustic addition is completed in a 31 minute period after which the stirring is maintained for 15 minutes of post-reaction with continuation of the above-mentioned heating-cooling cycles to maintain a temperature between 55 to 62° C. The product mixture is cooled to 35° C. followed by the addition of 300 ml deionized water. The product is transferred to 8 ounce bottles and centrifuged for 10 minutes at 2500 rpm. Approximately 800 ml of product is decanted off and returned to the reactor with an additional 97.5 g (1.05 equivalents) of epichlorohydrin. The above-mentioned caustic addition, post-addition, and separation steps are repeated a third and fourth time using a 15 minute addition time and 15 minute post-addition reaction time with the product being maintained at 50° C. (50% by weight sodium hydroxide third addition, 64.1 g, 0.80 equivalent: fourth addition, 64.1 g, 0.80 equivalent). After the fourth addition, the product is transferred to 8 ounce bottles and centrifuged for 10 minutes at 2400 rpm. The centrifuged samples form three distinct layers, a dark product phase (lower), an emulsion layer in the center, and a clear aqueous phase (upper layer). The lower two layers are drawn off and washed with two 500 ml portions of methylene chloride followed by 500 ml distilled water. The extract is deionized on a rotary evaporator under gradually increasing temperature and vacuum to achieve 105 to 106° C. at 1–2 torr (133–267 Pa) for 70 minutes. The final product is recovered in 49.5% yield (201.0 g) as a dark amber (Gardner color 11) liquid. Epoxide titration reveals the presence of 8.59±0.04% epoxide.

EXAMPLE 3

Epoxidation of Thiodiglycol

A 5-neck, 2 liter round bottom flask is modified with the following items: a jacket for heat transfer fluid, an outlet from the bottom with a 6 mm teflon stopcock, and baffles. The reactor is then fitted with a reflux condenser, a pressure equalizing addition funnel, a thermometer, a nitrogen inlet, and a mechanical stirring mechanism. Epichlorohydrin (773.63 g, 8.36 equivalents) is charged to the reactor with heating, stirring, and nitrogen blanket (0.5 lpm). Thiodiglycol (98.01 g, 1.60) equivalents) is added to the stirred epichlorohydrin followed by 20.92 g of the phase transfer catalyst (methyl trialkyl ($C_8$–$C_{10}$) ammonium chloride). This mixture is heated to 40° C. An aqueous solution of 50% by weight of sodium hydroxide (235.2 g, 2.94 equivalents) is poured into the pressure equalizing addition funnel and is added dropwise to the epichlorohydrin/-diol solution The reaction mixture produces an exotherm to 63° C. within 9 minutes and cooling water flow is initiated to the reactor jacket. The water is drained from the jacket allowing the mixture to reach a temperature of 57° C. This cooling cycle is repeated as necessary to maintain the temperature between 57 to 62° C. The caustic addition is completed in a 22 minute period after which the stirring is maintained for 15 minutes with continuation of the above-mentioned heating-cooling cycle. The product mixture is cooled to 35° C. followed by the addition of 300 ml deionized water. The mixture is transferred to a 2 liter separatory funnel. Approximately 503 ml of an aqueous raffinate (lower layer) is drawn off and discarded and approximately 680 ml of a dark brown product (upper layer) phase is drawn off and placed back into the reactor along with an additional amount of epichlorohydrin (95.4 g, 1.03 equivalents). Heating and stirring under the nitrogen blanket is resumed. The mixture is heated to 40° C. after which 50% by weight aqueous sodium hydroxide (103.8 g, 1.30 equivalents) is added dropwise over a 13 minute period. The temperature increased from 40 to 49° C. during the aqueous sodium hydroxide addition. The reaction mixture is then heated to a temperature 59 to 60° C. and is then maintained without further heating for ten minutes The mixture is then cooled to 35° C. and 300 ml of deionized water is added. The product is transferred to a 2 liter separatory funnel and drawn off from the aqueous raffinate. The sodium hydroxide addition is repeated a third time using 104.5 g, 1.31 equivalents added over a 14 minute period at 50-52° C. The mixture is heated to 60° C. and maintained without further heating for eleven minutes. The product mixture is cooled to 35° C. followed by the addition of 500 ml distilled water. The reactor contents are transferred to a 2 liter separatory funnel and the product (lower layer) is drawn off from the raffinate. The raffinate is set aside. The product is washed with an additional 500 ml distilled water. Both aqueous raffinates are combined and then extracted with 150 ml methylene chloride The methylene chloride extract is combined with the recovered product The product is distilled on a rotary evaporator under gradually increasing temperature and vacuum to achieve 103-5° C. at 1-2 torr (133-267 Pa) for 58 minutes. The recovered product is recovered in 100.6% yield (188.9 g) as a light amber colored liquid (Gardner color 6). The kinematic viscosity is 29 cks at 25° C. Epoxide titration reveals the presence of 31.51±0.02% epoxide.

EXAMPLE 4

Epoxidation of 2-Hydroxyethyldisulfide

A 5-neck, 2 liter round bottom flask is modified with the following items; a jacket for heat-transfer fluid, an outlet from the bottom with a 6 mm teflon stopcock, and baffles. The reactor is then fitted with a reflux condenser, a pressure equalizing addition funnel, a thermometer, nitrogen inlet, and a mechanical stirring mechanism. Epichlorohydrin (600.38 g, 6.49 equivalents) is charged to the reactor with heating, stirring, and a nitrogen blanket (0.5 lpm). 2-hydroxyethyldisulfide (99.63 g, 1.29 equivalents) is added to the stirred epichlorohydrin followed by 19.39 g of the phase transfer catalyst (methyl trialkyl ($C_8$-$C_{10}$) ammonium chloride). This mixture is heated to 40° C. An aqueous solution of 50% by weight of sodium hydroxide (192.1 g, 2.40 equivalents) is poured into the pressure equilizing addition funnel and is added dropwise to the epichlorohydrin/diol solution. The reaction mixture produces an exotherm to 64° C. within 6 minutes and cooling water flow is initiated to the reactor jacket. The water is drained from the jacket allowing the mixture to reach a temperature of 55° C. This cooling cycle is repeated as necessary to maintain the temperature between 55 to 64° C. The caustic addition is completed in a 27 minute period after which the stirring is maintained for 15 minutes with continuation of the above-mentioned heating-cooling cycle. The product mixture is cooled to 35° C. followed by the addition of 300 ml deionized water The mixture is transferred to a 2 liter separatory funnel. Approximately 483 ml of an aqueous raffinate (lower layer) is drawn off and discarded and approximately 550 ml of a dark brown product (upper layer) phase is drawn off and placed back into the reactor along with an additional amount of epichlorohydrin (97.5 g, 1.05 equivalents). Heating and stirring under the nitrogen blanket is resumed. The mixture is heated to 40° C. after which 50% by weight aqueous sodium hydroxide (88.8 g, 1.11 equivalents) is added dropwise over a 14 minute period. The temperature is maintained between 55 and 62° C. during the aqueous sodium hydroxide addition. After the addition, a temperature of 56° C. is maintained without further heating for fifteen minutes. The mixture is then cooled to 35° C. and 300 ml of deionized water is added. The product is transferred to a 2 liter separatory funnel and drawn off from the aqueous raffinate. The aqueous sodium hydroxide addition is repeated a third time with 88.0 g, 1.10 equivalents added over a 17 minute period at 50 to 56° C. The mixture maintained a temperature of 54-62° C. without further heating during the fifteen minute post reaction. The product mixture is cooled to 35° C. followed by the addition of 500 ml distilled water. The reactor contents are transferred to a 2L separatory funnel and the product (lower layer) is drawn off from the raffinate and washed with an additional 500 ml distilled water. The product is distilled on a rotary evaporator under gradually increasing temperature and vacuum to achieved 72-73° C. at 1-2 torr (133-267 Pa) for 59 minutes. The final product is recovered in 114% yield (196.1 g) as a dark brown colored liquid (Gardner color)18). The kinematic viscosity is 50.8 cks at 25° C. Epoxide titration reveals the presence of 32.14±0.20% epoxide.

EXAMPLE 5

A. Synthesis of a Bis(alkylenedithio)diol

Into a one liter flask, 500 g (6.41 moles) of $Na_2S$ is added with enough deionized water to bring the total volume to 900 ml. Sulfur (64 g, 2.00 moles) is added to the stirred mixture followed by heating at 101° C. for one hour. The mixture is cooled to 80° C. at which time 38 g of $MgCl_2.6H_2O$ dissolved in 50 ml of deionized water is added dropwise over a 5 to 10 minute period. Afterwards, 34 g of 50% aqueous NaOH dissolved in 50 ml deionized water is added dropwise over a 5 to 10 minute period. To this mixture, 66 g of NEKAL ™ BX78 (GAF Corporation) surfactant is quickly added dropwise over a 5 to 10 minute period. The solution is heated to 75° C. at which time ethylene dichloride (99 g, 1.00 mole) is added dropwise, followed by the dropwise addition of ethylene chlorohydrin (161 g, 2.00 moles). The solution is heated to 80° C. for one hour followed by heating at 90° C. for 0.5 hour. The solution is then cooled to 60° C. and then poured into 1500 ml deionized water The precipitate is allowed to settle out and then washed by decantation five times with 1500 ml portions of distilled water. The remaining slurry is acidified to a pH of 6 with glacial acetic acid. The residual water is then stripped off under vacuum. The product is recovered in 66.7% yield (164 g) as a light brown, solid product soluble in hot toluene. The product has a melting point of 75° C. and an elemental analysis of C 25.65%, H 4.46%, O 16.17%, S 53.72%; the calculated elemental analysis is C. 29.3%, H 5.7%, O 13.0%, S 52.0%. The bis(alkylenedithio)diol has the following statistical structure:

HOCH$_2$CH$_2$SSCH$_2$CH$_2$SSCH$_2$CH$_2$OH

B. Epoxidation of a Bis(alkylenedithio)diol

A 5-neck, 2 liter round bottom flask is modified with the following items: a jacket for heat-transfer fluid, an outlet from the bottom with a 6 mm teflon stopcock, and baffles. The reactor is then fitted with a reflux condenser, a pressure equalizing addition funnel, a thermometer, a nitrogen inlet, and a mechanical stirring mechanism. Epichlorohydrin (474.36 g, 5.13 equivalents) is charged to the reactor with heating, stirring, and a nitrogen blanket (0.5 lpm). A portion of the bis(alkylenedithio)diol from A, above (63.29 g, 0.51 equivalents) is added to the stirred epichlorohydrin followed by 11.55 g of the catalyst (methyl trialkyl (C$_8$-C$_{10}$) ammonium chloride). This mixture is heated to 40° C. An aqueous solution of 50% by weight of sodium hydroxide (72.6 g, 0.91 equivalent) is poured into the pressure equalizing addition funnel and is added dropwise to the epichlorohydrin/diol solution. The reaction mixture produces an exotherm to 63° C. within 16 minutes and cooling water flow is initiated to the reactor jacket. The water is drained from the jacket allowing the mixture to reach a temperature of 53° C. This cooling cycle is repeated as necessary to maintain the temperature between 53 and 60° C. The caustic addition is completed in a 29 minute period after which the stirring is maintained for 18 minutes with the continuation with the above-mentioned heating-cooling cycles. The product mixture is cooled to 35° C. followed by the addition of 500 ml deionized water. The mixture is transferred to a 2 liter separatory funnel. Approximately 450 ml of an aqueous raffinate is drawn off and discarded and approximately 6750 ml of product is drawn of and placed back into the reactor along with an additional amount of epichlorohydrin (95.9 g, 1.04 equivalents). Heating and stirring under the nitrogen blanket is resumed. The mixture is heated to 40° C. after which 50% by weight aqueous sodium hydroxide (39.2 g, 0.49 equivalent) is added dropwise over a 15 minute period. The temperature is maintained between 40 and 46° C. during the aqueous sodium hydroxide addition. After the addition, the mixture is heated to a temperature of 60° C. after which a temperature of 57 to 63° C. is maintained without further heating for eighteen minutes. The mixture is then cooled to 35° C. and 300 ml of deionized water is added. The product is transferred to a 2 liter separatory funnel and drawn off from the aqueous raffinate. The above-mentioned caustic addition, post-addition, and separation steps are repeated a third and fourth time using a 15 minute addition time and 15 minute post-addition reaction time with the product being maintained at 50° C. (50% by weight sodium hydroxide third addition: 36.6 g, 0.46 equivalent: fourth addition; 33.7 g, 0.42 equivalent). After the final caustic addition, and post-reaction, 300 ml of deionized water is added to the product The mixture is transformed to a 2 liter separatory funnel containing an additional 500 ml of deionized water. The product layer is rotary evaporated for 45 minutes at 110° C. under 1-2 torr (133-267 Pa) pressure. The product is titurated in toluene and filtered. The precipitate is washed with an additional 150 ml toluene followed by 400 ml deionized water and air dried. The product is transferred to a vacuum oven and dried for 26 hours at 75° C. under <5 torr (<667 Pa) pressure. The product is recovered in 20.2% yield (18.6 g) as a tan powder. Epoxide titration reveals the presence of 17.69% epoxide.

COMPARATIVE EXPERIMENT A

Epoxidation of Dipropylene glycol

A 5-neck, 2 liter round bottom flask is modified with the following items: a jacket for heat-transfer fluids, an outlet from the bottom with a 6 mm teflon stopcock, and baffles. The reactor is then fitted with a reflux condenser, a pressure equalizing addition funnel, a thermometer, a nitrogen inlet, and a mechanical stirring mechanism. Epichlorohydrin (1418.25 g, 15.33 equivalents) is charged to the reactor with heating, stirring, and a nitrogen blanket (0.5 lpm). Dipropylene glycol (201.05 g, 2.996 equivalents) is added to the stirred epichlorohydrin followed by 42.92 g of the phase transfer catalyst (methyl trialkyl C$_8$-C$_{10}$ ammonium chloride). This mixture is heated to 40° C. An aqueous solution of 50% by weight of sodium hydroxide (439.2 g, 5.49 equivalents) is poured into the pressure equalizing addition funnel and is added dropwise to the epichlorohydrin/diol solution. The reaction mixture produces an exotherm to 62° C. within 15 minutes and cooling water flow is initiated to the reactor jacket. The water is drained from the jacket allowing the mixture to reach a temperature of 57° C. This cooling cycle is repeated as necessary to maintain the temperature between 57 to 62° C. The caustic addition is completed over a 42 minute period after which the stirring is maintained for 15 minutes with the continuation of the above-mentioned heating-cooling cycle to maintain a temperature range between 57 and 62° C. The product mixture is cooled to 35° C. followed by the addition of 300 ml deionized water. The mixture is transferred to a 2 liter separatory funnel Approximately 650 ml of an aqueous raffinate (lower layer) is drawn off and discarded and approximately 1360 ml of a gold product (upper layer) phase is drawn off and placed back into the reactor along with an additional amount of epichlorohydrin (93.3 g, 1.01 equivalents). Heating and stirring under the nitrogen blanket is resumed. The mixture is heated to 40° C. after which 50% by weight aqueous sodium hydroxide (195.5 g, 2.44 equivalents) is added dropwise over a 25 minute period. The temperature is maintained between 40 and 53° C. during the aqueous sodium hydroxide addition. The reaction mixture then continued its exotherm and is maintained at a temperature between 56° to 58° C. without further heating for eleven minutes. The mixture is then cooled to 35° C. and 300 ml of deionized water is added. The product is transferred to a 2 liter separatory funnel and drawn off from the aqueous raffinate. The 50% by weight aqueous sodium hydroxide addition is repeated a third time using 196.1 g, 2.45 equivalents added over a 23 minute period at 50°-58° C. The mixture exothermed to 60° C. and maintained a temperature of 60 to 62 without further heating or cooling for a period of eleven minutes. The mixture is then cooled to 35° C. followed by the addition of 300 ml distilled water. The reactor contents are transferred to a 2 liter separatory funnel and the product (lower layer) is drawn off from the raffinate. The raffinate is set aside The product is transferred back into the reactor and the 50% by weight aqueous sodium hydroxide addition is repeated a fourth time (190.5 g, 2.38 equivalents) over a fifteen minute period. The temperature of the mixture increased from 50° to 55° C. during the addition and maintained a temperature between 57° to 60° C. for eleven minutes after the caustic addition. The mixture is cooled to 35° C. after which 300 ml of distilled water is added. The reactor contents are transferred to a 2 liter separatory funnel and the aqueous raffinate (lower) layer is drawn off. The product is washed with an additional 500 ml deionized water. The product is distilled on a rotary evaporator under gradually increasing temperature and vacuum under gradually increasing temperature and vacuum to achieve 105° to 110° C. at 1-2 torr (133-267 Pa) for 69 minutes. The final product is recovered in 100.7% yield (371.5 g) as a light amber colored liquid (Gardner color 7). The kinematic viscosity is 15 cks at 25° C. Epoxide titration reveals the presence of 31.08±0.08% epoxide.

EXAMPLE 6 Coating of Steel Panels with Resin/Curing Agent Solution

Portions of the respective epoxy resin formulations containing the aliphatic polythioethers and polysulfides made in the above examples are dissolved in the required solvents along with any additives. An amount of the polyalkylene amine curing agent in 10% stoichiometric excess is added to the resin solution and placed on a shaker bath for 15 minutes. The curing agent/resin formulations are then allowed to stand for an additional 45 minutes at ambient temperature prior to applying the resin coating. The components of the various resin formulations are detailed in Table I.

A 4"×12"×0.031" (20 guage) clean treated polished steel test panel is placed on a vacuum plate. The panel surface is wiped clean with a paper towel and acetone solvent. A wet film applicator is placed on the end of the panel farthest from the operator. Several milliliters of the resin coating mixture is poured in front of the applicator and the applicator is drawn toward the operator in a single motion. The coated panel is then set aside for seven days of ambient temperature (23-26° C.) curing prior to use in the testing of the physical properties using the methods delineated below:

The Acetic Acid Spot Test

A 1.125" diameter circle is drawn on the coated panel using a template. The area in the circle is checked for pinholes with a 5X magnifying glass. If pinholes or an excessive number of flaws are present, then another area is demarcated and again checked for flaws. Five thickness measurements are taken inside the circle to the nearest 0.1 mil. Beginning in the upper left quadrant of the circle, the first thickness reading is taken and continued in a clockwise manner with the last measurement being in the center. A ring of SILASTIC TM 732RTV silicone rubber sealant is applied over the marked circle. Approximately 1 ml of glacial acetic acid is dropped inside of the rubber ring and timing is begun with a stopwatch. A Petri dish bottom is placed over the tested area. Timing is stopped when initial signs of cracking or blistering begin to noticeably propagate through the coating. The time is recorded and plotted as a function of the minimum thickness of the demarcated area by a least-squares approximation of a power curve. The time required for glacial acetic acid to penetrate 2.0 mil (50.8 micrometers) is calculated from the graph and is recorded in Table II.

Methyl Ethyl Ketone Double Rub Test

Eight layers of cheese-cloth are wrapped around the ball of a 32 ounce ball-pien hammer. The cheese cloth is immersed in methyl ethyl ketone, and excess solvent is gently shaken off just prior to use. The coated panel to be tested is laid on a flat surface. The surface is rubbed with the MEK soaked cloth side of the hammer in a to and fro manner. One rub is counted as a complete back-and-forth movement. The rubbing is continued and the surface is checked for evidence of marring or breakthrough. The tests are taken to a maximum of 200 double rubs. The number of rubs necessary for each marring or breakthrough is then recorded in Table II.

Other tests used herein can be found in volume 6.01 of the 1986 ASTM Annual Book of Standards. These tests include:
D-3363-74 Pencil Hardness;
D-2794-84 Gardner Reverse Impact;
D-522-85 Conical Mandrel Bend;
D-3359-83 Measuring Adhesion by Tape Test.
The results are given in Table II.

TABLE I

Component Amounts of Coating Formulations

| Example | % Thioether epoxide in blend[1] | EEW of Resin Blend | Kinematic Viscosity at 25% of Resin Blend | Mass of Resin Blend Used in Formulation | Mass of Hardner[2] (gm) | Mass of Solvent[3] (gm) | Tack-free Time |
|---|---|---|---|---|---|---|---|
| 1 | 50.00 | 242.3 | 552 | 25.22 | 2.81 | 12.00 | 5.0 |
|   | 25.00 | 215.8 | 1653 | 24.87 | 3.12 | 12.00 | 1.8 |
|   | 12.51 | 202.8 | 3648 | 24.70 | 3.35 | 12.00 | 1.8 |
| 2 | 50.00 | 276.2 | 2436 | 25.52 | 2.51 | 12.02 | 2.0 |
|   | 25.00 | 228.2 | 4274 | 25.05 | 2.99 | 12.00 | 1.5 |
|   | 12.55 | 212.5 | 6714 | 24.86 | 3.16 | 12.00 | 2.1 |
| 3 | 49.96 | 158.9 | 175 | 17.95 | 3.06 | 9.00 | 1.0 |
|   | 24.98 | 174.7 | 786 | 18.19 | 2.82 | 9.00 | 1.0 |
|   | 12.50 | 183.2 | 2253 | 24.47 | 3.63 | 12.03 | 1.8 |
| 4 | 50.00 | 161.8 | 377 | 23.99 | 4.01 | 12.00 | 2.5 |
|   | 25.00 | 174.7 | 1340 | 24.24 | 3.76 | 12.00 | 2.5 |
|   | 12.44 | 182.9 | 3359 | 24.39 | 3.61 | 12.00 | 2.0 |
| Exp. A* | 50.01 | 159.8 | 114 | 29.92 | 5.07 | 15.19 | 2.5 |
|   | 24.87 | 178.5 | 660 | 24.39 | 2.69 | 12.00 | 2.5 |
|   | 12.66 | 187.3 | 2209 | 24.55 | 3.54 | 12.00 | 1.8 |

*Not an example of the present invention.
[1] The value is the wt. % of the epoxidized thioether dissolved in bisphenol A diglycidyl ether.
[2] Triethylenetetramine (amine hydrogen equivalent weight is 24.37 gm/eq) in 10% stoichiometric excess.
[3] Solvent is a mixture of n-butanol, propylene glycol methylether and cyclohexanone in 60:30:10 vol. ratio.

TABLE II

Physical Property Summary of Coatings

| TEST | Example 1 | | | Example 2 | | | Example 3 | |
|---|---|---|---|---|---|---|---|---|
| Blend | 50.00 | 25.00 | 12.51 | 50.00 | 25.00 | 12.55 | 49.96 | 24.98 |
| Pencil Hardness | F | F | 2H | F | F | H | 2B | 2H |
| Gardner Impact (Forward/ Reverse) | 160 / 80 | 100 / 100 | 92 / 80 | 112 / 80 | 100 / 100 | 64 / 52 | 100 / 56 | 80 / 68 |
| Conical Mandrel Bend (% elongation) | >32 | >32 | >32 | >32 | >32 | >32 | >32 | >32 |
| Cross-Cut Adhesion | 5A | 5A | 4A | 5A | 5A | 5A | 5A | 5A |
| MEK Double Rub | >200 | >200 | >200 | >200 | >200 | >200 | >200 | >200 |
| Acetic Acid Spot Test (minutes) | 50.3 | 92.0 | 85.3 | 35.7 | 74.3 | 74.4 | 89.8 | 104.4 |

| TEST | Example 3 | Example 4 | | | Experiment A* | | | Control*[1] |
|---|---|---|---|---|---|---|---|---|
| Blend | 12.50 | 50.00 | 25.00 | 12.44 | 50.01 | 24.97 | 12.66 | |
| Pencil Hardness | 2H | HB | 2H | 2H | 2H | 5H | 2H | H |
| Gardner Impact (Forward/ Reverse) | 72 / 60 | 80 / 40 | 60 / 24 | 40 / 12 | 100 / 52 | 64 / 20 | 56 / 24 | — / 4 |
| Conical Mandrel Bend (% elongation) | >32 | >32 | >32 | >32 | >32 | >32 | >32 | 17 |
| Cross-Cut Adhesion | 4A | 5A | 5A | 5A | 5A | 5A | 5A | 5A |
| MEK Double Rub | >200 | >200 | >200 | >200 | >200 | >200 | >200 | >200 |
| Acetic Acid Spot Test (minutes) | 78.6 | 120.8 | 92.8 | 59.6 | 57.4 | 70.1 | 73.8 | 71.3 |

*Not an example of the present invention.
[1] A diglycidyl ether of bisphenol A having an EEW of __ of __.

EXAMPLE 7

Epoxidation of Thiodiglycol using Solid Sodium Hydroxide

A 2-liter resin kettle equipped with mechanical stirrer, a reflux condenser, thermometer and a nitrogen inlet is charged with thiodiglycol (100.0 g, 1.64 equivalents), epichlorohydrin (757.3 g, 8.18 equivalents) and 60% aqueous benzyltrimethylammonium chloride (35.7 g). The contents are then heated to 50° C with stirring under a nitrogen atmosphere. Sodium hydroxide (98.2 g, 2.46 equivalents) is added to the reactor over a 38 minute period so as to maintain reaction temperature between 50° C. and 62° C. After completion of the sodium hydroxide addition, the reaction mixture is held at 60° C. for 47 minutes followed by dilution with 200 ml of toluene. The recovered reaction mixture is transferred to a separatory funnel then washed with 350 ml of deionized water followed by transfer of the organic layer back into the resin kettle reactor. After reheating to 60° C., a second addition of sodium hydroxide (65.8 g, 1.65 equivalents) is started and is completed over a 24 minute period so as to maintain a 60° C. to 63° C. reaction temperature. After completion of the sodium hydroxide addition, the reaction mixture is held at 60° C. for 15 minutes followed by distillation with 200 ml of toluene. The recovered reaction mixture is transferred to a separatory funnel, then washed with two 350 ml portions of deionized water. Additional dilution with 200 ml of methylene chloride is followed by washing with three portions of deionized water. The recovered organic layer is distilled on a rotary evaporator for one hour at 110° C. to provide 208.4 g of a crude product containing 39.3% epoxide. Further distillation at 110° C. and 1–2 torr (133–267 Pa) for 1 hour, then at 100° C. for 1.5 hours provides 169.2 g of a light amber colored liquid. Epoxide titration reveals the presence of 33.7% epoxide. Gas chromatographic analysis during the distillation step reveals that progressive removal of a diglycidyl ether coproduct has occurred.

What is claimed is:

1. A thermosettable (curable) composition comprising
   (I) an epoxy resin composition resulting from dehydrohalogenating the reaction product of one or more polysulfides with an epihalohydrin which polysulfides are represented by the following formulas I or II or a combination of such polysulfides

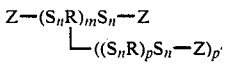
                                              I.

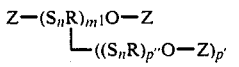
                                              II.

wherein each R is independently a polyvalent organic radical with each valence residing on a carbon atom and having from one to about 18 carbon atoms; each Z is independently a hydroxyalkyl or inertly substituted hydroxyalkyl monovalent radical having from 1 to about 36 carbon atoms; p and m are independently zero or a positive integer having a value from 1 to about 40; p" and m¹ are independently a positive integer having a value from 1 to about 40; n is a number from 1 to about 8 and p' is zero or a positive integer which is the difference between the valence of R and two; and (II) a curing quantity of at least one suitable curing agent and/or curing catalyst therefor.

2. A thermosettable (curable) composition of claim 1 wherein each R independently has from about 2 to about 12 carbon atoms; each Z independently has from about 2 to about 12 carbon atoms; p and m are independently positive integers having a value of from 1 to about 12; p" and m¹ are independently positive integers having a value from 1 to about 12; and n is a number from 1 to about 4.

3. A thermosettable (curable) composition of claim 2 wherein each R independently has from about 2 to about 6 carbon atoms; each Z independently has from about 2 to about 6 carbon atoms; p and m are independently positive integers having a value of from 1 to about 6; p" and m¹ are independently positive integers having a value from 1 to about 6; and n is a number from 1 to about 2.

4. A thermosettable (curable) composition of claim 1 wherein the polysulfide is
HO—((CH$_2$CH$_2$SCH$_2$CH$_2$O)$_{0.7}$—(CH$_2$CH$_2$SCH$_2$CH(CH$_3$)O)$_{0.3}$)$_n$—H where n has a value from about 4 to about 6,
HO—((CH$_2$CH$_2$SCH$_2$CH$_2$O)$_{0.7}$—OCH$_2$CHOHCH$_2$O— (CH$_2$CH$_2$SCH$_2$CH(CH$_3$)O)$_{0.3}$)$_n$—H where n has a value from about 8 to about 10, HOCH$_2$CH$_2$SSCH$_2$CH$_2$SSCH$_2$CH$_2$OH, thiodiglycol, 2-hydroxyethyldisulfide, or a combination thereof.

5. A thermosettable (curable) composition comprising an epoxy resin composition of claim 1 wherein said curing agent and/or catalyst is one or more primary or secondary polyamines, polycarboxylic acids and anhydrides thereof, one or more compounds having an average of more than one aromatic hydroxyl group per molecule or a combination thereof.

6. A thermosettable (curable) composition comprising an epoxy resin composition of claim 5 wherein said curing agent and/or catalyst is a polyalkylene polyamine, or bisphenol or a combination thereof.

7. A thermosettable (curable) composition comprising an epoxy resin composition of claim 2 wherein said curing agent and/or catalyst is one or more primary or secondary polyamines, polycarboxylic acids and anhydrides thereof, one or more compounds having an average of more than one aromatic hydroxyl group per molecule or a combination thereof.

8. A thermosettable (curable) composition comprising an epoxy resin composition of claim 7 wherein said curing agent and/or catalyst is a polyalkylene polyamine, a bisphenol or a combination thereof.

9. A thermosettable (curable) composition comprising an epoxy resin composition of claim 3 wherein said curing agent and/or catalyst is one or more primary or secondary polyamines, polycarboxylic acids and anhydrides thereof, one or more compounds having an average of more than one aromatic hydroxyl group per molecule or a combination thereof.

10. A thermosettable (curable) composition comprising an epoxy resin composition of claim 9 wherein said curing agent and/or catalyst is a polyalkylene polyamine, a bisphenol or a combination thereof.

11. A thermosettable (curable) composition comprising an epoxy resin composition of claim 4 wherein said curing agent and/or catalyst is one or more primary or secondary polyamines, polycarboxylic acids and anhydrides thereof, one or more compounds having an average of more than one aromatic hydroxyl group per molecule or a combination thereof.

12. A thermosettable (curable) composition comprising an epoxy resin composition of claim 11 wherein said curing agent and/or catalyst is a polyalkylene polyamine, a bisphenol or a combination thereof.

* * * * *